(12) United States Patent
Solaro et al.

(10) Patent No.: US 8,316,018 B2
(45) Date of Patent: Nov. 20, 2012

(54) NETWORK-COMMUNITY RESEARCH SERVICE

(75) Inventors: John Solaro, Bellevue, WA (US); Kathleen P. Mulcahy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 12/116,946

(22) Filed: May 7, 2008

(65) Prior Publication Data

US 2009/0282017 A1  Nov. 12, 2009

(51) Int. Cl.
*G06F 17/30* (2006.01)
*G09B 3/00* (2006.01)
*G09B 7/00* (2006.01)

(52) U.S. Cl. ........................................ 707/732; 434/322

(58) Field of Classification Search ............... 707/748, 707/749, 732; 434/322, 350
See application file for complete search history.

(56) References Cited

U.S. PATENT DOCUMENTS

| | | | | |
|---|---|---|---|---|
| 6,873,982 | B1* | 3/2005 | Bates et al. | 707/737 |
| 6,916,180 | B1* | 7/2005 | Price et al. | 434/219 |
| 7,296,016 | B1 | 11/2007 | Farach-Colton et al. | |
| 7,634,466 | B2* | 12/2009 | Rose et al. | 1/1 |
| 7,657,523 | B2* | 2/2010 | Ebanks | 707/999.005 |
| 7,788,260 | B2* | 8/2010 | Lunt et al. | 707/727 |
| 2003/0227479 | A1* | 12/2003 | Mizrahi et al. | 345/753 |
| 2004/0110119 | A1* | 6/2004 | Riconda et al. | 434/350 |
| 2005/0026131 | A1* | 2/2005 | Elzinga et al. | 434/365 |
| 2005/0227216 | A1* | 10/2005 | Gupta | 434/322 |
| 2005/0256866 | A1* | 11/2005 | Lu et al. | 707/5 |
| 2006/0004892 | A1 | 1/2006 | Lunt et al. | |
| 2006/0036748 | A1* | 2/2006 | Nusbaum et al. | 709/228 |
| 2006/0235873 | A1 | 10/2006 | Thomas | |
| 2006/0271524 | A1* | 11/2006 | Tanne et al. | 707/3 |
| 2007/0050201 | A1* | 3/2007 | Gardner et al. | 705/1 |
| 2007/0203906 | A1 | 8/2007 | Cone et al. | |
| 2007/0214121 | A1 | 9/2007 | Ebanks | |
| 2007/0226248 | A1* | 9/2007 | Darr | 707/102 |
| 2007/0231780 | A1* | 10/2007 | Shulman | 434/350 |
| 2007/0255831 | A1 | 11/2007 | Hayashi et al. | |
| 2007/0271232 | A1 | 11/2007 | Mattox et al. | |
| 2008/0005072 | A1 | 1/2008 | Meek et al. | |

OTHER PUBLICATIONS

Fox, "Mahalo Adds the Social Graph to Search", Dec. 12, 2007, pp. 4.

"Search Results Based on your Social Network", 1997-2008, SourceForge, Inc., pp. 7.

Mislove, et al., "Exploiting Social Networks for Internet Search", HotNets 2006, pp. 79-84.

* cited by examiner

*Primary Examiner* — Jorge A Casanova

(74) *Attorney, Agent, or Firm* — Alleman Hall McCoy Russell & Tuttle LLP

(57) ABSTRACT

A network-community research service includes a research module to receive a research query from a requesting member belonging to a network community. The research module is configured to answer the research query with a ranked list of research results at least partially prioritized based on network-community activities of non-requesting members.

19 Claims, 5 Drawing Sheets

FIG. 7

**-- DIGITAL CLASSROOM --
WELCOME MEMBER G**

| RESEARCH | SUBJECTS | SCHEDULE | CALENDAR | eigenvalue (SEARCH)

1. http://mathworld.wolfram.com/Eigenvalue.html 2. http://encarta.msn.com/dictionary_561538554/eigenvalue.html
   - *tagged by Member F*

3. ▬▬▬▬▬▬▬▬▬▬▬▬▬▬▬

4. http://en.wikipedia.org/wiki/Vector_%28spatial%29
   - *bookmarked by Member A*

5. http://planetmath.org/encyclopedia/Eigenvalue.html
   - *visited by Member B for 35 minutes* (N)

6. ▬▬▬▬▬▬▬▬▬▬▬▬▬▬▬
7. ▬▬▬▬▬▬▬▬▬▬▬▬▬▬▬
8. ▬▬▬▬▬▬▬▬▬▬▬▬▬▬▬
9. ▬▬▬▬▬▬▬▬▬▬▬▬▬▬▬
10. ▬▬▬▬▬▬▬▬▬▬▬▬▬▬▬
11. ▬▬▬▬▬▬▬▬▬▬▬▬▬▬▬
12. ▬▬▬▬▬▬▬▬▬▬▬▬▬▬▬
13. ▬▬▬▬▬▬▬▬▬
14. ▬▬▬▬▬▬▬▬▬▬▬▬▬▬▬

Prev 1 2 3 4 5 6 7 8 9 10 Next

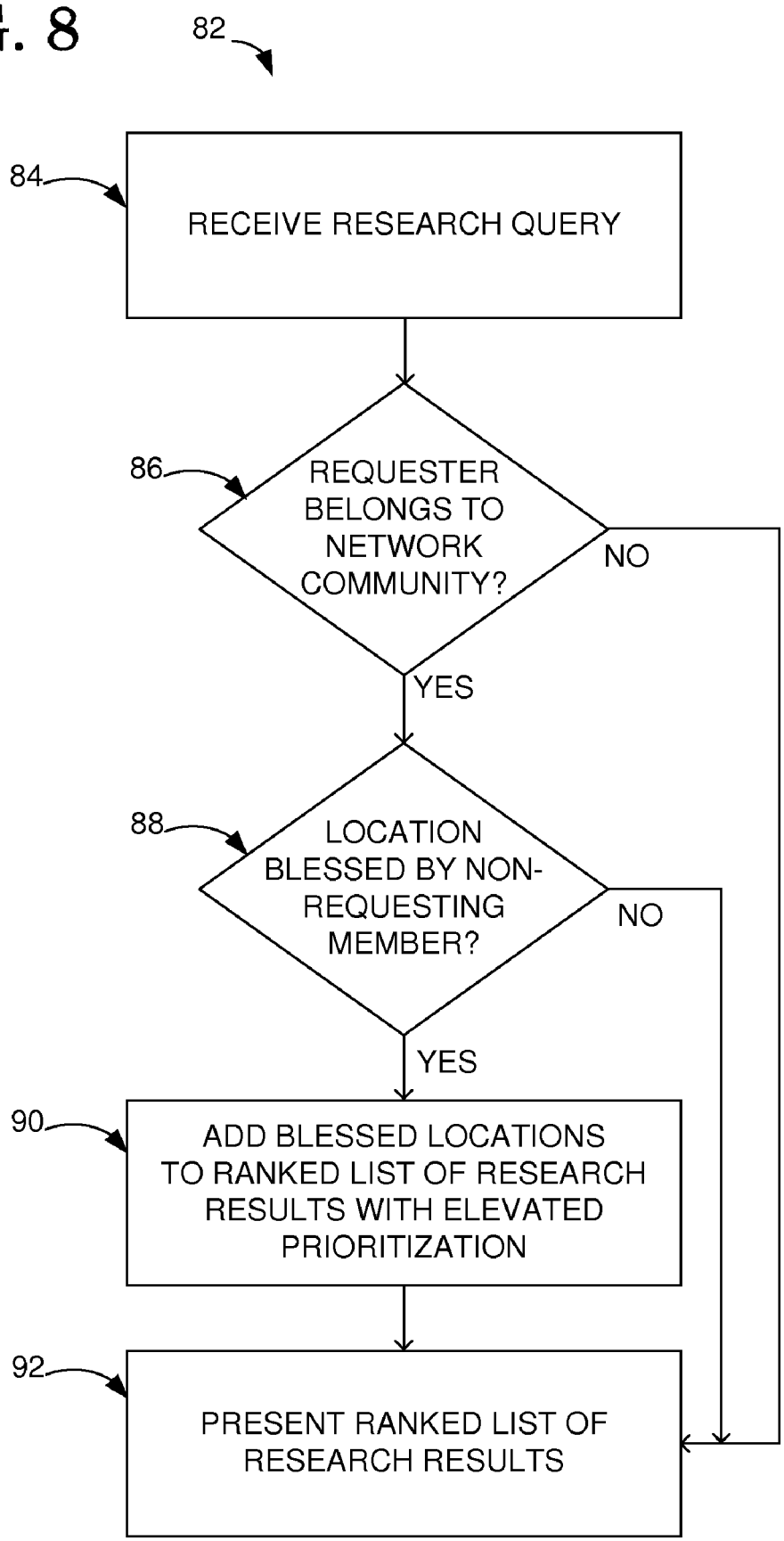

NETWORK-COMMUNITY RESEARCH SERVICE

BACKGROUND

Internet research has become a popular tool that teachers and students use in educational settings. Various search engines often serve as a launch pad for an educational research project. However, most search engines are not capable of providing personalized search results that are specifically tailored to the needs of a student, but instead provide every user with the same results for the same search. Even when current search engines do attempt to provide "personalized" search results, they often do so based only on past searches of that individual. As such, current search engine technology is not well suited for the educational setting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A network-community research service serves as a research tool for members of a network community. The network-community research service receives research queries from members of the network community, and answers the research queries with a ranked list of research results. The ranked list of research results is prioritized, at least in part, based on the network activities of other network-community members.

BRIEF DESCRIPTION OF THE DRAWINGS

FIG. 7 shows the user interface of FIG. 5 presenting a different ranked list of research results in response to a received research query.

FIG. 8 shows a process flow of an example method for facilitating online research.

DETAILED DESCRIPTION

A network community, such as an online educational community, may include a plurality of different members. For example, one or more teachers and one or more students may collectively form a network community. Such members of a network community may have common research interests derived, at least in part, from an affiliation with the network community. As discussed below, a network-community research service can improve research efficiency for one or more members of the network community by leveraging the network-community activities of other members.

While described below in the context of an online educational community including a teacher and a plurality of students, it should be understood that a network-community research service can be used by virtually any type of network community. Further, while described in the context of an Internet community performing World Wide Web searches, it should be understood that a network-community research service may be used with virtually any type of network for virtually any type of research.

Figure 1:
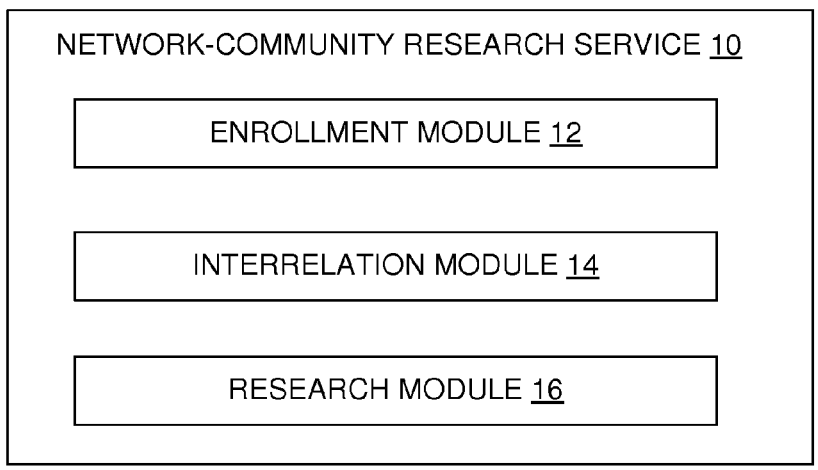
FIG. 1 schematically shows a network-community research service in accordance with an embodiment of the present disclosure.

FIG. 1 somewhat schematically shows a network-community research service 10. In some embodiments, network-community research service 10 may be an educational-community research service offering World Wide Web searching to a plurality of teachers and students via the Internet. World Wide Web searching is a nonlimiting example of a tool that teachers and/or students may use to research a topic of interest. As described in more detail below, the network-community research service can take advantage of the relationships between the various community members and their relevant actions in order to provide improved research functionality to the community members. In particular, the network activity of community members can be used to find, filter, or select research results for another community member.

Network-community research service 10 includes an enrollment module 12, an interrelation module 14, and a research module 16. Each module may include hardware, software, firmware, and/or a combination thereof. As a nonlimiting example, one or more network server computers may be configured to execute software for carrying out the below described functionality of the enrollment module, the interrelation module, and/or the research module. Further, such modules may be implemented alongside other modules, which may provide other functionality. As a nonlimiting example, the enrollment module, the interrelation module, and/or the research module may be submodules of a larger network-community service that may provide functionality such as user groups, message boards, web logs, wikis, reference sites, URL recommendations and sharing, and/or electronic mail, among others.

Enrollment module 12 may be configured to maintain a roster of members belonging to a network community. As a nonlimiting example, the enrollment module may be configured to maintain a roster of teachers and students that are members of the same online educational community.

An online educational community can be virtually any size. Some online educational communities may include one teacher and students of the one teacher. Other online educational communities may include teachers affiliated with one or more different educational institutions, teachers that are not affiliated with any educational institution, students enrolled in one or more educational institutions, and/or students that are not enrolled in any educational institution. Furthermore, network communities other than online educational communities are within the scope of this disclosure.

The enrollment module can accommodate a variety of different enrollment schemes, including, but not limited to: opt in (e.g., students proactively sign up for inclusion in the online educational community), mandatory (e.g., teachers enroll students in the online educational community), opt out (e.g., teachers enroll students in the online educational community, but students may proactively leave the online educational community), and assumed (e.g. simply by using a website or another piece of software, data is anonymously collected, aggregated, and used to improve results of other users). In some embodiments, the enrollment module is configured to allow each member belonging to the network community to shield selected network-community activities from being used to prioritize research results. In this way, a member can benefit from the community while also keeping selected network activity private from the community.

A roster of network-community members may be maintained in a central location, and/or a roster may be at least partially maintained throughout two or more distributed locations. As an example of a centralized roster, a server may include a data structure including the membership information for the various members belonging to a network community. As an example of a distributed roster, each user may maintain a cookie or other data structure that includes membership information for that particular user.

Figure 2:
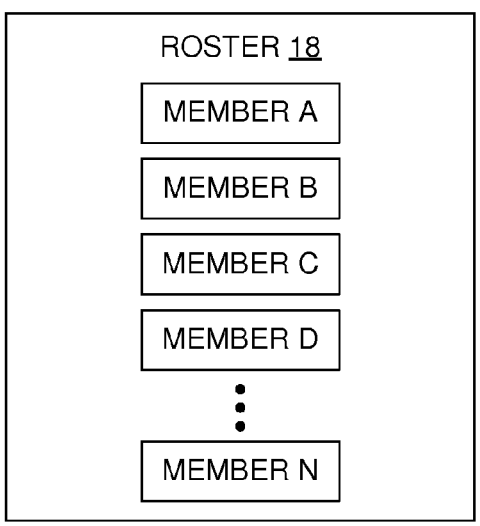
FIG. 2 schematically shows a roster of network-community members.

FIG. 2 somewhat schematically depicts a roster 18 of network-community members. In the illustrated example, roster 18 includes member A through member N. The roster may include, for each member, a member identity, a username, a password, bibliographical information, World Wide Web browsing information, World Wide Web bookmark information, or virtually any other information.

Briefly turning back to FIG. 1, interrelation module 14 may be configured to maintain a map defining network-community associations between two or more network-community members belonging to the network community. The map may be used to track the various relationships that a network-community member may have with other network-community members.

Figure 3:
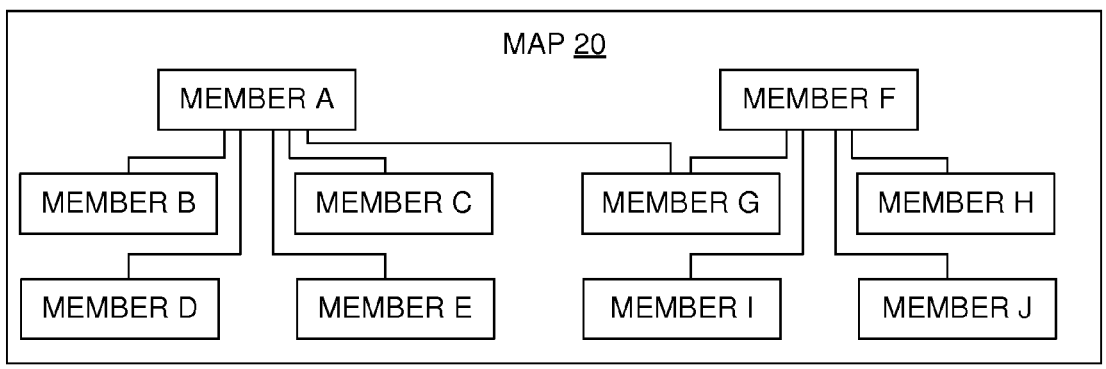
FIG. 3 schematically shows a map defining relationships between network-community members.

FIG. 3 somewhat schematically depicts a map 20 that defines network-community associations between network-community Members A-J. In the illustrated example, Member A is directly connected to Members B-E. As a nonlimiting example, such an arrangement may exist if Member A is a teacher, and each of Members B-E are students of Member A. In this scenario, Member A has one degree of separation with each of Members B-E.

Member G has one degree of separation with Member A and Member F. As a nonlimiting example, such an arrangement may exist if Member G is taking a class taught by Member A and a different class taught by Member F. In such a scenario, none of Members B-E are taking the class taught by Member F, and none of Members B-E are classmates with Member G. However, Member A serves as a bridge between Members B-E and Members F-J. In such a scenario, Members B-E each have two degrees of separation with Member G, three degrees of separation with Member F, and four degrees of separation with Members H-J.

A variety of different types of relationships may be mapped by interrelation module 14. As discussed above, a class enrollment may be one type of relationship mapped by the interrelation module. As another example, the contacts in a member's address book may form the basis of a mapped relationship. A member's instant messenger or chat buddies may also serve as a basis for mapped relationships. Common subscription to a newsletter, common enrollment to a message board, and/or other network associations may form the basis of a relationship recognized by interrelation module 14. It should be understood that virtually any type of relationship may be recognized by the interrelation module. Such relationships may be explicitly established by the members, or implicitly assumed based on one or more characteristics and/or activities of the members.

Further, it should be understood that map 20 may be centralized at a common location or distributed throughout a plurality of remote devices (e.g., a peer-to-peer network), and the map may be represented using virtually any appropriate data structure. In some embodiments, a master map may track the relationships for all members of a network community. In other embodiments, a map that tracks the relationships for a particular member may be associated with that member. The enrollment module and the interrelation module may optionally combine roster 18 and map 20 into one or more common data structures.

Briefly turning back to FIG. 1, research module 16 may be used by a member of the network community to perform research. In the illustrated example, the research module allows a network-community member to perform general web searches and/or vertical searches constrained to a particular topic or group of topics (e.g., topics around which a network community is formed).

Figure 4:
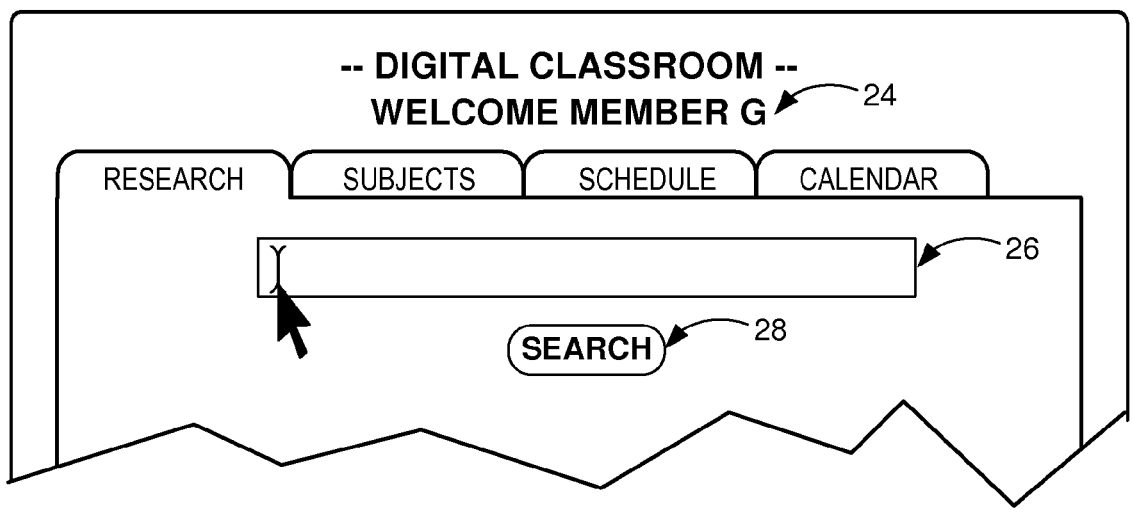
FIG. 4 schematically shows a portion of a user interface for implementing a research module of the network-community research service of FIG. 1.

A research module can be implemented using a variety of different interfaces, including various types of graphical user interfaces. FIG. 4 somewhat schematically shows a nonlimiting example of a digital classroom 22 in the form of a World Wide Web Site. As indicated at 24, Member G is currently logged in to the digital classroom. The digital classroom includes a field 26 into which a member of a network community (e.g., Member G) may enterer a research query.

Figure 5:
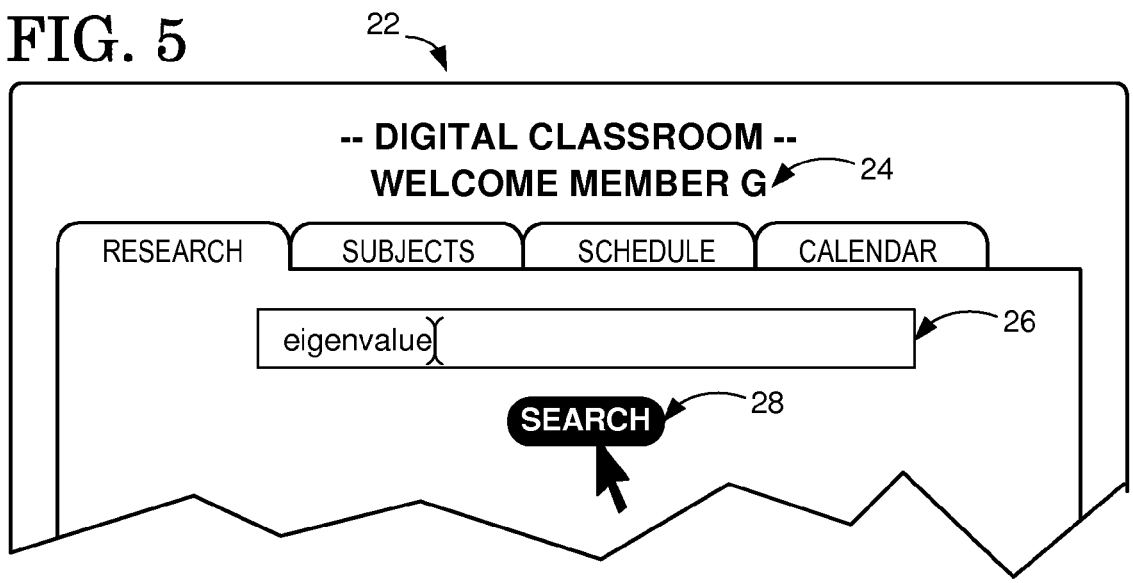
FIG. 5 shows the user interface of FIG. 4 receiving a research query.

Research module 16 can be configured to receive a research query from a requesting member belonging to the network community. For example, as shown in FIG. 5, Member G can type a research query (e.g., "eigenvalue") into field 26 and click a search button 28. It should be understood that this is a nonlimiting example, and virtually any type of research query can be made using virtually any type of interface.

A research query may be sent to the research module, which is configured to answer the research query with a ranked list of research results at least partially prioritized based on network-community activities of non-requesting members. In other words, the research module utilizes information from the network community when selecting and/or prioritizing research results that are to be presented to a network-community member. The research module is not constrained to performing a blind search that is not customized to a particular researcher, nor is the research module constrained to utilizing only information about a particular researcher when answering a research query from that researcher. The research module can use information from other members of the network community to improve the research results.

Figure 6:
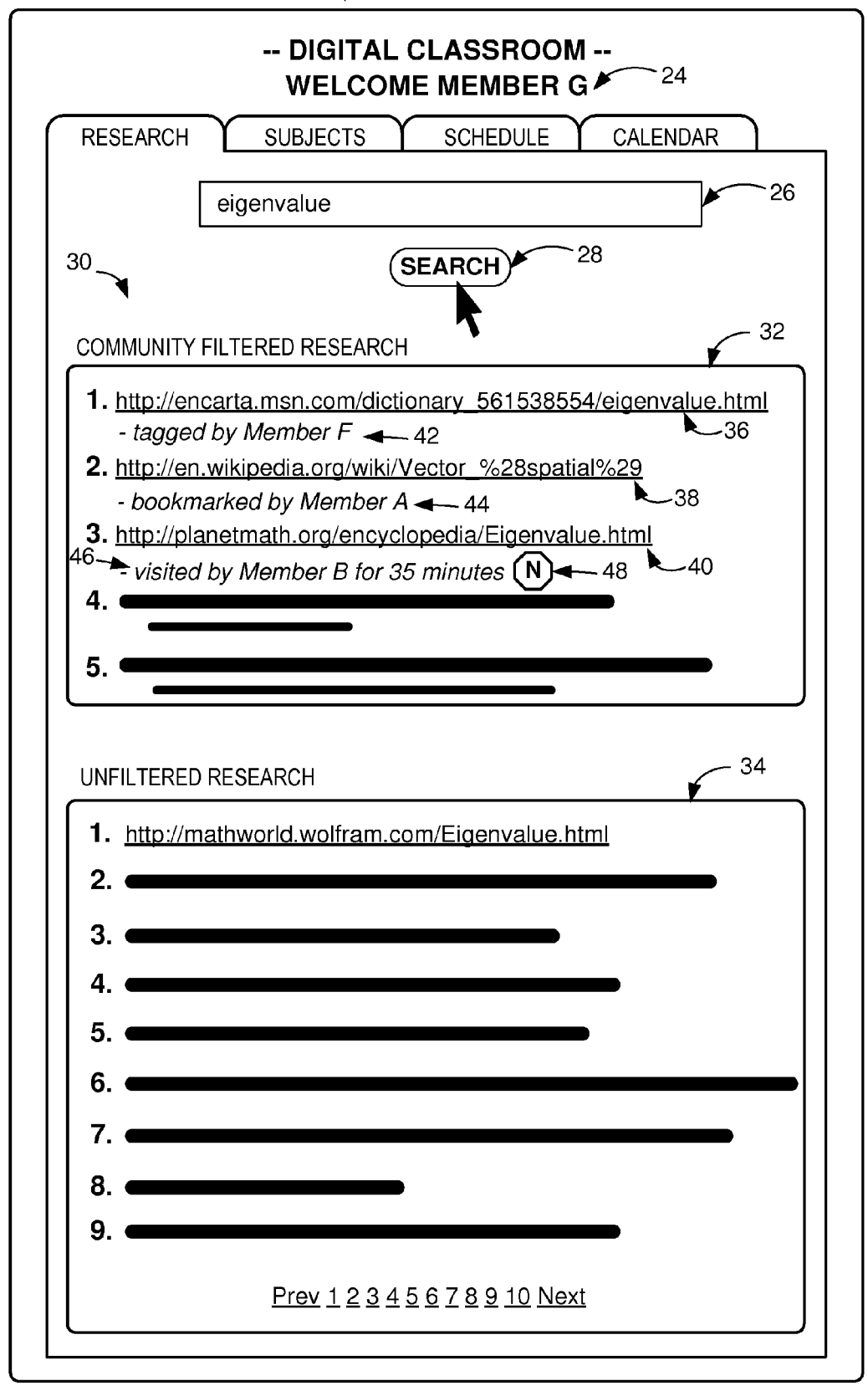
FIG. 6 shows the user interface of FIG. 5 presenting a ranked list of research results in response to a received research query.

FIG. 6 shows a nonlimiting example of a ranked list 30 of research results delivered by research module 16. In the illustrated embodiment, the ranked list includes two separate sublists. First, the ranked list includes network-community research results 32 having elevated rankings based on network-community activities of non-requesting members. Next, the ranked list includes non-community research results 34 having rankings unaffected by network-community activities of non-requesting members.

The non-community research results are analogous to search results from a search engine that does not utilize network-community information when answering research queries. When providing the network-community research results, the research module takes advantage of the relationships between members of the network-community.

As a nonlimiting example, Member F may teach a linear algebra class and assign homework dealing with eigenvalues. As such, Member G may take advantage of the network-community research service to complete the homework. In particular, Member G may submit an "eigenvalue" research query to the research module. As shown below by way of nonlimiting example, the research module may utilize the network community when answering the research query.

As shown at 36, the research module may answer a research query with a research result that is selected and/or prioritized because it has been tagged, bookmarked, visited, saved, recommended, or otherwise blessed by another member of the network community. In other words, the research module can elevate a ranking of a research result if a non-requesting member previously tagged that research result. Furthermore, it should be understood that the requesting member can bless (e.g., tag, bookmark, rate, etc.) a result for future users.

In the illustrated example, a World Wide Web Site from encarta.msn.com has been tagged by Member F. For example, while preparing the homework assignment, Member F, the teacher of the linear algebra class, may have decided that the information from encarta.msn.com would be useful in completing the assignment. As such, Member F tagged the site so that it could be easily found by students using the network-community research service. In some embodiments, a network-community member may tag a site with one or more keywords (e.g., eigenvalue).

The level of prioritization of a network-community research result may be at least partially determined by a degree of separation between the network-community member submitting the research query and the network-community member whose network activity elevated the ranking of the research result. In other words, the more closely a requesting network-community member is associated with a non-requesting network-community member, the more the research module will elevate the ranking of a research result that has been tagged, bookmarked, visited, saved, recommended, or otherwise blessed by that non-requesting network-community member.

For example, in the above discussed example, Member G is only separated from Member F by one degree. Therefore, the network activity of Member F can be heavily weighted when prioritizing the research results, in this case, elevating it to the top position in the ranked list of research results. If Member F were separated from Member F by two or more degrees, the encarta.msn.com research result may be lower on the ranked list of research results.

Further, the research module can weight educational-community activities of non-requesting teachers greater than educational-community activities of non-requesting students when prioritizing the research results.

In some embodiments, tag information for network-community members may be tracked using roster 18 and/or map 20.

As shown at 38, the research module may elevate a ranking of a research result if a non-requesting member previously bookmarked that research result. In the illustrated example, Member A has bookmarked a World Wide Web Site from wikipedia.org. Member A is only separated from Member G by one degree. As such, the information that Member A has found relevant enough to bookmark is likely to be relevant to Member G. In some embodiments, bookmark information for network-community members may be tracked using roster 18 and/or map 20.

As shown at 40, the research module may elevate a ranking of a research result if a non-requesting member previously visited that research result. In the illustrated example, Member B has visited a World Wide Web Site from planetmath.org. In some embodiments, the amount a research result is elevated may be at least partially based on an amount of time a network-community member has visited the site and/or a number of different times the network-community member has gone back to the site. For example, a research result may only be elevated if a non-requesting member has visited the research result for longer than a predetermined threshold duration. In some embodiments, browsing history for network-community members may be tracked using roster 18 and/or map 20.

A research result may be further elevated if two or more different network-community members have visited, tagged, bookmarked, or otherwise blessed the research result.

One or more research results can be presented with an identifier indicating a non-requesting member whose network-community activity elevated a ranking of that network-community research result. For example, identifier 42 indicates that the encarta.msn.com research result was tagged by Member F, identifier 44 indicates that the wikipedia.org research result was bookmarked by Member A, and identifier 46 indicates that the planetmatbh.org research result was visited for 35 minutes by Member B. Other types of identifiers, including symbols, avatars, graphics, video clips, or audio clips may be used.

One or more research results can be presented with notes non-requesting members have previously submitted for that research result. For example, FIG. 6 shows a note 48 from Member B. Such a note may include text, audio, and/or images from Member B regarding the planetmath.org research result. This feature allows network-community members to easily collaborate and share commentary.

In the embodiment illustrated in FIG. 6, every network-community research result is ranked higher than any non-community research result. As shown, the network-community research results and the non-community research results may optionally be presented apart from one another. In this manner, network-community research results can be presented without affecting non-community research results. In some embodiments, the research results may be further separated. For example, research results that a teacher has explicitly tagged for a class may be separated from other network-community research results and non-community research results.

In some embodiments, network-community research results may be presented inline with non-community research results. For example, FIG. 7 shows the same research query and research answers as FIG. 6, but with a ranked list 50 that presents network-community research results and non-community research results together. In such a scheme, one or more non-community research results may be ranked higher than one or more network-community research results. For example, the first research result for the mathworld.worlfram.com World Wide Web Site is ranked higher than all network-community research results. This demonstrates that prioritizations given to network-community research results need not trump all other factors used to select and rank research results. It should be understood that in some embodiments, the research module may consider the network-community activities of non-requesting members as a single factor in a multi-factor process for selecting and/or prioritizing search results.

FIG. 8 shows a process flow of a nonlimiting example method 82 for facilitating online research. At 84, method 82 includes receiving a research query from a requester via a computer network. For example, a research query may be submitted by the requester from a World Wide Web Site offering general or vertical search capabilities. The research query may be transmitted to a research service configured to answer the research query.

At 86, method 82 includes determining if the requester belongs to a network community. Such a determination may be made by comparing login information to an enrollment roster, by member use of a specific website or feature, or by virtually any other suitable mechanism. In some embodiments, the research service may only be offered to members of a network community, and thus receipt of a research query affirms membership to the network community.

At 88, method 82 includes comparing the research query to network locations blessed by non-requesting members of the network community if the requester belongs to the network community. In some embodiments, a list of possible research results is compiled, and then the preliminary results from the list are compared to network locations blessed by one or more non-requesting members. In other words, each preliminary research result (e.g., uniform resource locator), may be checked to determine if the priority of that research result should be elevated. Blessed locations may include, but are not limited to, network locations that have been tagged, bookmarked, or visited by non-requesting members of the network community. In some embodiments, all results from a particular domain (e.g., encarta.com) or a particular top level domain (e.g., .edu) may be blessed.

At 90, method 82 includes adding a network location to a ranked list of research results with an elevated prioritization if that network location has been blessed by a non-requesting member of the network community and includes a reference to the research query. If the network location has not been blessed by a non-requesting member, the network location may be added to the ranked list of research results, but without an elevated prioritization. In other words, it may be ranked lower than if it had been blessed by one or more non-requesting members.

At 92, method 82 includes presenting the ranked list of research results to the requester via the network. In some embodiments, the ranked list may be presented as two or more separate sublists, one of which may include only research results with elevated prioritizations based on the network activity (i.e., blessing) of other network-community members. In some embodiments, blessed and unblessed research results may be presented together.

It will be appreciated that the embodiments described herein may be implemented, for example, via computer-executable instructions or code, such as programs, stored on one or more computer-readable storage device and executed by a computing device. Such storage devices exclude signals per se. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms, storage device, "computer", and "computing device" as used herein include any device that electronically executes one or more programs, including two or more such devices acting in concert.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A network server computer, comprising:
   a computer-readable storage device;
   an enrollment module to maintain a roster of teachers and students belonging to an online educational community, the enrollment module further configured to allow each member belonging to the online educational community to shield selected educational-community activities; and
   a research module to receive, via a computer network, a research query from a requesting student belonging to the online educational community, the research module configured to answer the research query with a ranked list of community filtered research results from outside of the online educational community, the ranked list of community filtered research results at least partially prioritized based on educational-community activities of non-requesting students or non-requesting teachers belonging to the online educational community, the ranked list of community filtered results excluding prioritization based on shielded educational-community activities of non-requesting students or non-requesting teachers belonging to the online educational community.

2. The network server computer of claim 1, where the research module weights educational-community activities of non-requesting teachers greater than educational-community activities of non-requesting students when prioritizing the research results.

3. The network server computer of claim 1, where one or more research results are presented with an identifier indicating a teacher or student whose educational-community activity elevated a ranking of that research result.

4. The network server computer of claim 1, where one or more research results are presented with notes non-requesting students or teachers have previously submitted for that research result.

5. The network server computer of claim 1, where the research module elevates a ranking of a research result if a non-requesting student or teacher previously tagged that research result.

6. The network server computer of claim 1, where the research module elevates a ranking of a research result if a non-requesting student or teacher previously visited that research result.

7. The network server computer of claim 1, where the research module elevates a ranking of a research result if a non-requesting student or teacher previously bookmarked that research result.

8. A network server computer, comprising:
   a computer-readable storage device;
   an enrollment module to maintain a roster of members belonging to a network community;
   an interrelation module to maintain a map defining network-community associations between two or more network-community members belonging to the network community, where the map defines a degree of separation between a requesting member and a non-requesting member; and
   a research module to receive a research query from the requesting member belonging to the network community, the research module configured to answer the research query with a ranked list of research results at least partially prioritized based on network-community activities of non-requesting members occurring before the research module receives the research query, and at least partially prioritized based on the degree of separation between the requesting member and the non-requesting member, such that the research module elevates a ranking of a research result in proportion to a closeness of association to a non-requesting member that blesses the research result, where the enrollment module is configured to allow each member belonging to the network community to shield selected network-community activities from being used to prioritize research results.

9. The network server computer of claim 8, where the ranked list includes network-community research results having elevated rankings based on network-community activities of non-requesting members, and non-community research results having rankings unaffected by network-community activities of non-requesting members.

10. The network server computer of claim 9, where one or more non-community research results are ranked higher than one or more network-community research results.

11. The network server computer of claim 9, where every network-community research result is ranked higher than any non-community research result.

12. The network server computer of claim 8, where one or more research results are presented with an identifier indicating a non-requesting member whose network-community activity elevated a ranking of that network-community research result.

13. The network server computer of claim 8, where one or more research results are presented with notes non-requesting members have previously submitted for that research result.

14. The network server computer of claim 8, where the ranked list of research results includes a sublist of community filtered research results and a sublist of unfiltered research results.

15. The network server computer of claim 8, where the research module elevates a ranking of a research result if a non-requesting member previously tagged that research result.

16. The network server computer of claim 8, where the research module elevates a ranking of a research result if a non-requesting member previously visited that research result.

17. The network server computer of claim 8, where the research module elevates a ranking of a research result if a non-requesting member previously bookmarked that research result.

18. The network server computer of claim 8, where the research module elevates a ranking of a research result if a non-requesting member previously visited the research result for longer than a predetermined threshold duration.

19. A method of facilitating online research, comprising:
receiving a research query from a requester via a computer network;
determining if the requester belongs to a network community;
if the requester belongs to the network community, comparing the research query to network locations blessed by non-requesting members of the network community;
if a network location blessed by a non-requesting member of the network community includes a reference to the research query, adding that network location to a ranked list of research results with an elevated prioritization;
if a network location shielded by a non-requesting member of the network community includes a reference to the research query, shielding that network location from the ranked list of research results; and
presenting the ranked list of research results to the requester via the network.

* * * * *